United States Patent [19]

Shiba

[11] 4,168,043
[45] Sep. 18, 1979

[54] TAPE CASSETTE

[75] Inventor: Haruo Shiba, Tokyo, Japan

[73] Assignee: TDK Electronics Co., Ltd., Tokyo, Japan

[21] Appl. No.: 891,644

[22] Filed: Mar. 30, 1978

[30] Foreign Application Priority Data

May 25, 1977 [JP] Japan .............................. 52-67370[U]

[51] Int. Cl.² .............................................. G03B 1/04
[52] U.S. Cl. .................................................. 242/199
[58] Field of Search ............... 242/55, 19 A, 197–199, 242/76; 226/190, 194, 196; 360/96, 132

[56] References Cited

U.S. PATENT DOCUMENTS

| | | | |
|---|---|---|---|
| 3,065,922 | 11/1962 | Ballauf | 242/199 |
| 3,393,849 | 7/1968 | Hass | 226/194 |
| 3,751,043 | 8/1973 | Bracci | 242/199 |
| 3,991,956 | 11/1976 | Machida | 242/199 |

Primary Examiner—Leonard D. Christian
Attorney, Agent, or Firm—Oblon, Fisher, Spivak, McClelland & Maier

[57] ABSTRACT

A tape cassette including a cylindrical tape guide having a slit in the axial direction and a groove at the end thereof which is fitted to a projection of a pole connected to a half of the case. The cylindrical tape guide can also be provided with a first and second notch formed therein as a substitute for the groove. Moreover, a groove can be formed at each end of the cylindrical tape guide.

4 Claims, 12 Drawing Figures

TAPE CASSETTE

BACKGROUND OF THE INVENTION

1. Field of the Invention

The present invention relates to a tape cassette. More particularly, it relates to a tape cassette which has a cylindrical tape guide having a slit whose position is fixed in the case.

2. Description of the Prior Art

A guide for guiding the running of a tape is disposed in a tape cassette or a cartridge having at least one reel for winding the tape in a case.

FIG. 1 is a schematic view of a conventional video tape cassette. In FIG. 1, the reference numeral (1) designates a lower half of a case in which a tape (4) is wound on a feeding reel (2) and within which the winding reel (3) are held. The tape (4) is unwound from the feeding reel (2), along a guide (5) and a roller (6) to the outer part of the case and is fed past a roller (6') and a guide (5') and wound on the winding reel (3).

The tape is run unwound to the outer part in the video tape cassette etc., whereby the friction between the tape and the guide should be minimized. The tape is for example unwound at high speed such as in a computer, etc. the friction should accordingly be minimized and for this reason a shaved round bar is usually used as the guide. In order to prepare properly such a round bar, many processes for shaving and polishing etc. are needed thus resulting in high cost of production.

The conventional guides (5), (5') are prepared by shaving and polishing a round bar and tapping the same to form taps (8) for screwing at the centers of the upper and lower edges as shown in FIG. 2. The guides are fixed between the lower half of the case and an upper half-case (9) with screws (11), (12).

In order to overcome the disadvantage of the conventional tape cassette, the inventors has proposed new type cassette tape in their previous application (Japanese Utility Model Application No. 71275/1976). The structure thereof will be explained hereinbelow.

The guide of such application is different from the above-mentioned roller and is not rotated. Accordingly, it is not always necessary to have smooth surface for all cylindrical surfaces. That is, the surface which is not contacted with the tape need not be smooth. Therefore, the guide can be formed by bent one sheet of a plate in cylindrical shape and the seam, i.e. the slit is disposed to a position such that the tape is not contacted to the seam.

The previous invention has been attained by such consideration. The embodiment of the previous invention is illustrated in FIG. 4 which shows a guide (13) for the cassette tape. The guide (13) is prepared by bending one sheet of a mental plate in a cylindrical shape whereby a slit (14) is formed.

In order to set the cylindrical tape guide (13) on the cassette tape, the guide can be fixed between the upper and lower halfs of the case from both sides with screws.

The thickness of the tape guide (13) can be made relatively thin by bending a plate in a cylindrical shape. Accordingly, as shown in FIG. 5, the tape guide (13) can be fitted on a pole (17) projected from the lower half-case (1) or the upper half-case (9) as one piece (In FIG. 5, it is projected from the lower half (1) of the case and the pole (17) is fixed to the other half of the case (in FIG. 5, it is the upper half (9) of the case) with a screw (18).

As shown in FIG. 6, the projected part (23) of the upper half (9) of the case can be fitted in the pole (17) to be fix instead of thereto utilizing a screw.

As shown in FIG. 7, the cylindrical tape guide (13) can be fitted to the inner part of the cylindrical frame (19) of one half of the case (in FIG. 7, it is the lower half (1) of the case) to fix them.

In all cases, the fitting is further found to be satisfactory by utilizing the resilient effect of the cylindrical tape guide (13) with the slit (14).

In the tape cassette proposed in the previous invention, the cylindrical tape guide has the above described slit and accordingly, it is necessary that the slit should be disposed to prevent contact with the tape.

SUMMARY OF THE INVENTION

It is an object of the present invention to provide a tape cassette which has a cylindrical tape guide whose slit is not contacted with a tape without failure.

The foregoing and other objects of the present invention have been attained by providing a cassette tape which comprises a cylindrical tape guide having a slit in the axial direction and a groove at the end which is fitted to a projection of a pole connected to a half-case.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
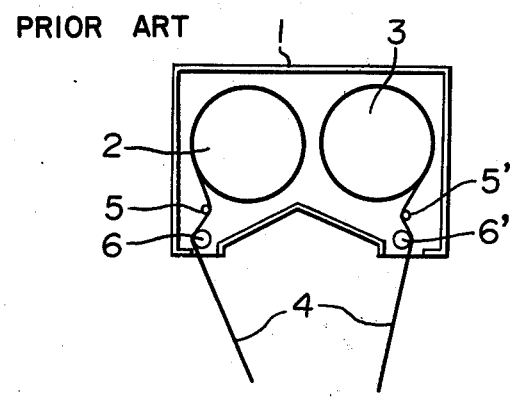
FIG. 1 is a schematic view of a video tape cassette without an upper half of the case being shown.
Figure 2:
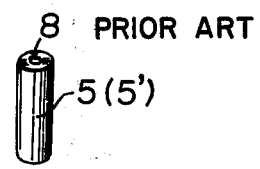
FIG. 2 is a schematic view of a guide in the conventional cassette tape.
Figure 3:
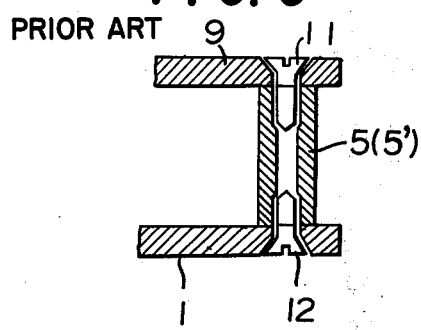
FIG. 3 is a partial sectional view of a guide fixed on the upper and lower half of the case.
Figure 4:
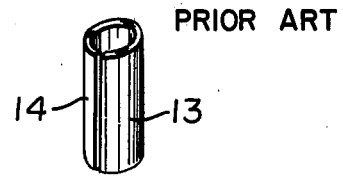
FIG. 4 is a schematic view of a guide used in the tape cassette of a previous invention of the present inventor.
Figure 5:
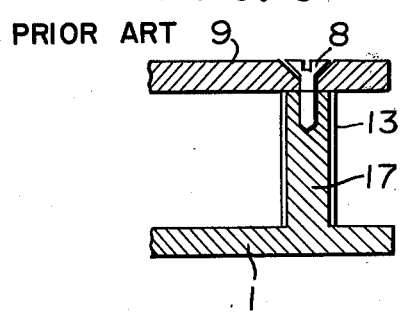
FIGS. 5 to 7 are, respectively sectional views of the guide fitted in the tape cassette according to different concepts.
Figure 6:
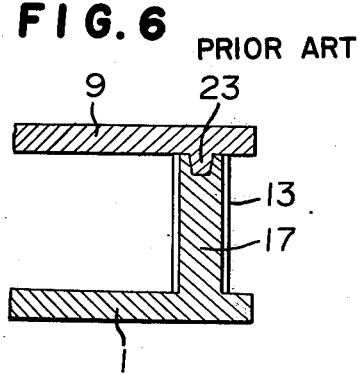
Figure 7:
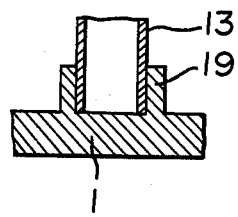
Figure 8:
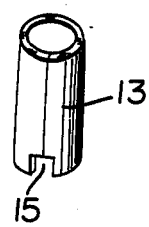
FIG. 8 is a schematic view of one embodiment of a cylindrical tape guide for the tape cassette according to the present invention.

In the tape cassette of the present invention, a groove (15) is formed at one end of the cylindrical tape guide (13) as shown in FIG. 8.

Figure 9:
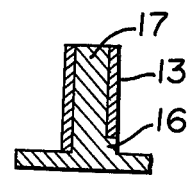
FIGS. 9 and 10 are a sectional view and a schematic view, respectively, showing the cylindrical tape guide fitted on a pole of a half portion of the case case.
Figure 10:
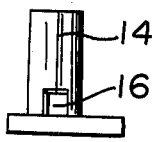

On the other hand, a projection (16) is formed on a pole (17) as shown in FIGS. 9 and 10 whereby the groove (15) is fitted to the projection (16) by fitting the cylindrical tape guide (13) to the pole (17). Thus, the position of the cylindrical tape guide (13) is precisely fixed whereby shifting of the slit (14) to a position contacting with the tape is presented.

Figure 11:
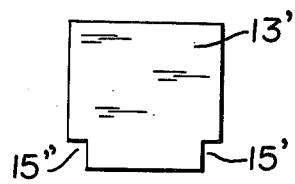
FIG. 11 is a sectional view of the cylindrical tape guide of FIG. 8.

The groove (15) can be formed at any suitable part of the end of the cylindrical tape guide (13). When the groove (15) is formed on the slit (14) as shown in FIG. 8 is not felt to be desirable, the same can be formed by notches (15), (15) at both ends of a plate (13') for the cylindrical tape guide (13) derived from bending one sheet of the plate to form the cylindrical tape guide (13) as shown in FIG. 11 and cooperating with respective projections formed on the pole (17). Accordingly, the fabrication of the cylindrical tape guide having the groove is easily accomplished.

Figure 12:
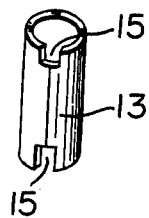
FIG. 12 is an elevational view of the other embodiment of a cylindrical tape guide of the present invention.

It is also possible in accordance with the present invention to form the groove (15) at both ends of the cylindrical tape guide (13) as shown in FIG. 12.

In accordance with the present invention, the tape guide in the tape cassette is a cylindrical tape guide having a slit which is prepared by bending a plate. Accordingly, the cost in production of the same is remarkably low and the characteristic of the guide is not inferior to the conventional expensive model. An economical tape cassette which avoids the occurrence of friction between the tape and the slit can thus be obtained.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tape cassette which comprises;
   a cylindrical tape guide having a slit in the axial direction thereof; and,
   a pole connected to a half of a case wherein the cylindrical tape guide has a groove at each end thereof and the pole has a projection fitted to the groove at each end of the cylindrical tape guide.

2. A tape cassette according to claim 1 wherein the groove at each end of the cylindrical tape guide is formed on the slit.

3. A tape cassette according to claim 1 wherein said groove at each end of cylindrical tape guide comprises a first and second notch formed along said groove of said cylindrical tape guide.

4. A tape cassette according to claim 1 wherein the cylindrical tape guide comprises a cylindrical plate having a smooth surface of low friction.